United States Patent [19]

Cascone

[11] 4,003,715

[45] Jan. 18, 1977

[54] COPPER-MANGANESE-ZINC BRAZING ALLOY

[75] Inventor: Paul J. Cascone, New Rochelle, N.Y.

[73] Assignee: A. Johnson & Co. Inc., Nynashamn, Sweden

[22] Filed: June 13, 1975

[21] Appl. No.: 586,562

Related U.S. Application Data

[63] Continuation-in-part of Ser. No. 427,326, Dec. 21, 1973, abandoned.

[52] U.S. Cl. ............................. 29/182.3; 29/195; 29/196.3; 29/196.5; 75/157.5; 75/134 B; 75/134 C; 219/145

[51] Int. Cl.² ................. B32B 15/18; B32B 15/20

[58] Field of Search ............ 75/157.5, 159, 134 B, 75/134 C, 134 M; 219/145, 145 A, 145 M; 29/196, 196.3, 196.5, 196.6, 504, 182.3

[56] References Cited

UNITED STATES PATENTS

| | | | |
|---|---|---|---|
| 3,676,088 | 7/1972 | Pryor | 29/194 |
| 3,693,246 | 9/1972 | Novikov | 29/504 |

FOREIGN PATENTS OR APPLICATIONS

| | | | |
|---|---|---|---|
| 897,484 | 3/1945 | France | 75/157.5 |
| 868,276 | 5/1961 | United Kingdom | 75/157.5 |

OTHER PUBLICATIONS

"Studies on Properties of Some Ternary Copper Alloys of the Cu-Mn-Zm and Cu-Mn-Ni System". Mukherjee et al. Trans. Indian Inst. Metals, 9/66 pp. 141-142.

*Primary Examiner*—Arthur J. Steiner
*Attorney, Agent, or Firm*—Hopgood, Calimafde, Kalil, Blaustein and Lieberman

[57] ABSTRACT

A brazing alloy composition is provided for brazing together a ferrous metal part to another part, said alloy comprising about 15% to 30% manganese, about 15% to 30% zinc, 0 to about 10% nickel (e.g. 0.5% to 10%) and the balance essentially copper ranging from about 45% to 65%, the brazed joint produced comprising a ferrous metal part on one side strongly bonded at the interface to another part.

14 Claims, 7 Drawing Figures

COPPER-MANGANESE-ZINC BRAZING ALLOY

This application is a continuation-in-part of U.S. Ser. No. 427,326, filed Dec. 21, 1973, now abandoned.

This invention relates to a brazing alloy of the copper-manganese-zinc type and to a method of brazing metal parts, including joints produced thereby.

STATE OF THE ART

Brazing is a process in which metal parts are joined by means of forces of interatomic attraction acting across the joint, that is, at the abutting surfaces of the parts brazed together. This is achieved by using a brazing alloy which is interposed between abutting clean surfaces of the parts to be brazed using a flux (e.g. a halide salt, borax, boric acid, etc.) and the assembled parts then heated to above the melting point of the brazing alloy so that the alloy flows and wets the abutting surfaces, such that upon solidifying, a strong joint is obtained. The kind of brazing alloy employed depends upon the materials to be brazed together and the end use of the completed joint. For example, if the resulting joint is to be used at an elevated temperature, such as a component in heat engines, e.g. rotary combustion engines, the braze at the joint should have a sufficiently high melting point and also provide the required strength at said elevated temperatures.

A case in point is the brazing of ductile iron parts in the construction of rotary combustion engines.

Ductile iron is another name for cast iron in which the free graphite is in the nodular or spheroidal form in the as-cast condition. The brazing of ductile iron is critically important in that the temperature during brazing should not exceed 1750° F and preferably not exceed 1700° F; otherwise, if the temperature is too high, diffusion of carbon is apt to occur into the surrounding ferrite grains, whereby the nodular graphite is replaced by pearlite. This adversely affects the properties of the ductile iron part.

On the other hand, if the brazing alloy is low melting, for example, melts below 1400° F, its strength in a joint will generally deteriorate at elevated temperatures. Thus, it would be desirable to provide a brazing alloy having a melting point below 1750° F and preferably falling within the range of about 1500° F and 1700° F, for example, a melting point of at least about 1550° F, to enable brazing at above the melting point of the alloy, such as at 1650° F. Such brazing temperatures would be advantageous in the brazing of ductile iron without adversely affecting the metallographic structure thereof.

OBJECTS OF THE INVENTION

It is thus the object of the invention to provide a novel brazing alloy composition for the brazing of ferrous metal parts.

Another object is to provide a brazing alloy and method for brazing a ferrous metal part, e.g. ductile iron, to another part, or a ferrous metal part to a non-metallic part.

A further object is to provide a brazed joint in which the brazing metal is an alloy of copper-manganese-zinc.

These and other objects will clearly appear from the following disclosure and the accompanying drawing, wherein.

STATEMENT OF THE INVENTION

Stating it broadly, the brazing alloy of the invention consists essentially of copper-manganese-zinc, the composition ranging by weight from about 15% to 30% manganese, about 15% to 30% zinc, 0 to about 10% nickel (e.g. about 0.5 to 10% or about 1% to 8%) and the balance essentially about 45% to 65% copper, the alloy composition being selected within the foregoing range to provide a melting point below about 1750° F (955° C) and preferably from about 1500° F to 1700° F (815° C to 873° C). Nickel is optional. However, it adds to the strength of the joint.

The foregoing compositions in the molten state wet cast iron very easily and provide strong joint. Ternary alloys of copper-manganese-zinc (note U.S. Pat. No. 2,479,596) are known for producing cast or wrought metal shapes. However, such alloys have not been recognized for use as brazing alloys in joining ferrous metal parts together, such as parts of ductile cast iron.

Figure 1:
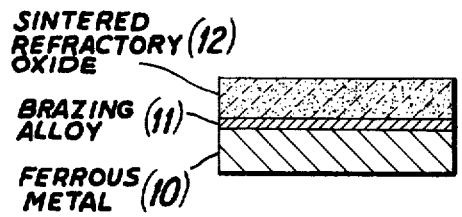
FIGS. 1 to 4 are enlarged cross sections of illustrative brazed joints utilizing the novel brazing alloy of the invention.

As illustrative of the various types of joints that can be obtained using the brazing alloy of the invention, reference is made to the drawing. In FIG. 1, a ferrous metal substrate 10, plain carbon steel (e.g. 1040 steel) is shown bonded via brazing alloy 11 to a sintered refractory oxide ceramic 12 of $Al_2O_3$, e.g. alundum, the brazing alloy comprising 50% Cu, 23% Mn, 22% Zn and 5% Ni.

Figure 2:
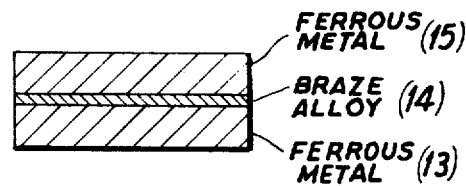

FIG. 2 illustrates a joint of a ferrous metal 13 (e.g. 1040 steel) brazed via braze alloy 14 (58% Cu, 20% Mn, 16% Zn and 6% Ni) to ferrous metal 15 (also 1040 steel).

Figure 3:
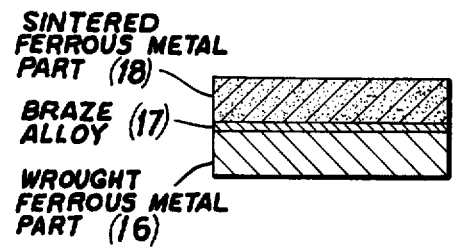

An advantage of the braze alloy is that one of the ferrous metal parts may be a sintered powder metallurgy part of steel. For example, the powder metallurgy part may be brazed to a ferrous metal substrate, e.g. wrought steel. Because of the nature of the braze alloy, it does not substantially infiltrate the powder metallurgy part being brazed. Thus, FIG. 3 illustrates a brazed joint comprising a wrought carbon steel 16 brazed to a sintered steel composition via braze alloy 17 (50% Cu, 23% Mn, 22% Zn and 5% Ni). A preferred composition is one containing by weight 50% Cu, 24.5% Zn, 24.5% Mn and 1% Ni.

Figure 4:
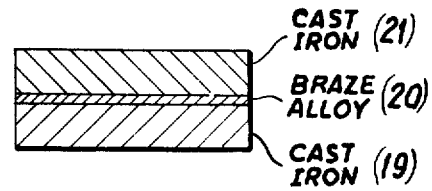

FIG. 4 illustrates a joint of one cast iron part 19 brazed to another cast iron part 21 via the braze alloy 20 of the invention.

Figure 5:
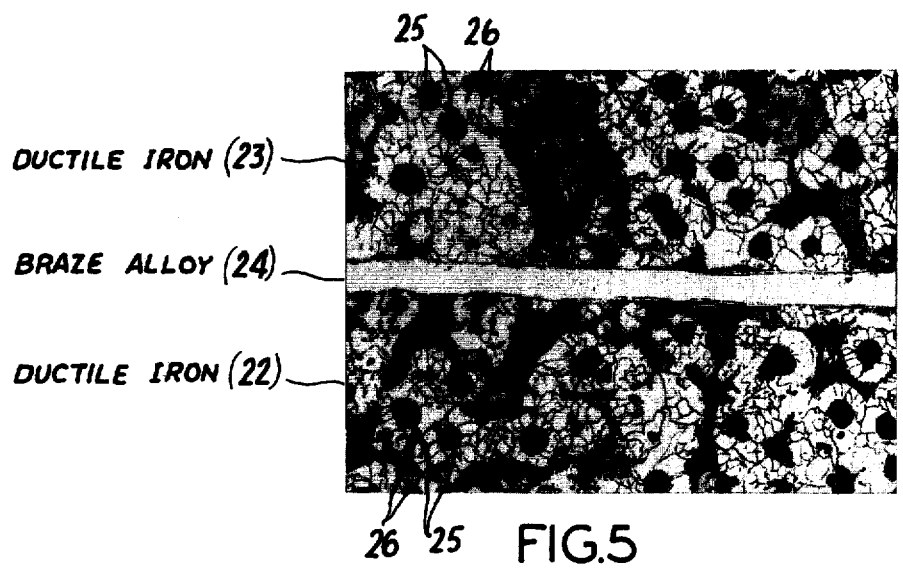
FIG. 5 is a photomicrograph taken at 100 times magnification depicting a brazed joint in which a ductile iron part is brazed to another ductile iron part.

As illustrative of a metallographic structure of an actual joint between two parts of ductile cast iron, reference is made to FIG. 5 which is a representation of a photomicrograph taken at 100 times magnification. As will be noted, both parts 22, 23 are characterized metallographically by a distribution of nodular or spheroidal graphite 25 surrounded by ferrite 26, the two parts being strongly bonded at their abutting surfaces by braze alloy 24 comprising 50% Cu, 23% Mn, 22% Zn and 5% Ni.

Figure 6:
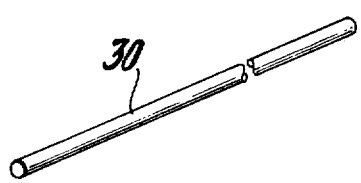
FIGS. 6 and 7 are illustrative of wrought elements of the brazing alloy for use in brazing, FIG. 6 depicting a brazing wire or rod and FIG. 7, a brazing strip element.
Figure 7:
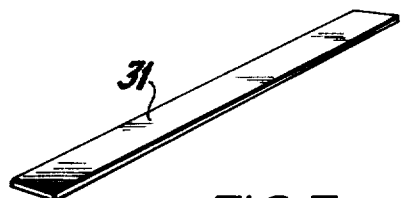

The braze alloy may be used in various forms of braze elements, such as wire or rod 30 shown in FIG. 6 or strip 31 shown in FIG. 1.

The presence of zinc in amounts ranging from about 14% or 15% to 30% is important in order to utilize manganese in the range of about 15% to 30%. Normally, manganese oxidizes easily to manganese oxide which is stable and impedes the flow of the brazing alloy, even with a flux. I have found that the presence of 14% or 15% to 30% zinc in the alloy inhibits the oxidation of manganese and provides a freely flowing braze alloy, especially where the brazing is carried out in a furnace having an endothermic atmosphere, for example, an atmosphere of partially combusted natural gas, wet or dry.

The brazing alloy is applicable to the brazing of a ferrous metal part to another ferrous metal part or to a non-ferrous part, or to a sintered non-metal part selected from the group consisting of a sintered refractory oxide ceramic (e.g. sintered $Al_2O_3$) and sintered borides, silicides and carbides of the refractory metals Zr, Ti, W, Mo and Cr.

The brazing of the latter (borides, silicides and carbides) is particularly advantageous where it is desired to provide a ferrous substrate with a wear resistant surface. It is known to use a boride rod as an electrode in molten salt baths. Thus, a portion of the electrode not inserted in the bath can be steel rod, while the portion of the electrode employed in the bath can be brazed to the end of the steel rod for economy reasons since sintered borides, silicides and carbides are expensive.

As illustrative of the invention, the following examples are given:

EXAMPLE 1

Two parts of ductile cast iron are assembled into a lap-joint configuration with a strip of the brazing metal interposed at the common interface, the brazing strip comprising 50% Cu, 23% Mn, 22% Zn and 5% Ni. A flux comprising borax, boric acid, borates and known wetting agents (e.g. AWS Type 5 referred to on page 687 in the ASM Handbook entitled *Welding and Brazing*, Vol. 8, 1971) is placed adjacent to the lap-joint and the assembly passed through a brazing furnace controlled at a temperature of 1650° F. The endo gas in the furnace is reducing and comprises 40% $N_2$, 40% $H_2$ and 20% CO, dew point being about 30° F to 35° F. The braze alloy melts and wets the materials and forms a clean strong joint. The presence of the high zinc inhibited the oxidation of manganese and provided a free flowing braze at the joint during brazing. A good free-flowing braze is obtained even in a furnace atmosphere using a wet exo gas because of the relatively high zinc content.

The lap-joint produced was subjected to a shear stress of 21,000 psi (lbs/in$^2$) without breaking. A tensile specimen comprising two pieces of cast iron brazed in end-to-end relationship was subjected to tensile loading with failure occurring at 74,000 psi. The fracture occurred through the base material and not through the braze.

Another test was conducted using a brazing alloy containing 58.3% Cu, 20.2% Mn, 15.7% Zn and 5.8% Ni. The shear strength obtained was over 15,000 psi and the tensile strength about 51,000 psi. Another suitable alloy is one containing 25% Mn, 20% Zn and 55% Cu.

EXAMPLE 2

An advantage of the brazing alloy is that a powder metallurgy steel part can be brazed to a steel substrate. A steel-forming mixture is produced from carbonyl iron powder containing about 0.4% carbon. The powder is compacted into a cylindrical slug of about one inch in diameter and about one inch high by pressing in a die at about 25 tons/in$^2$. The powder metallurgy part is then placed on a substrate of 1040 steel with a strip of the brazing alloy interposed between the abutting surfaces (55% Cu, 25% Mn, 14% Zn and 6% Ni), a flux of the AWS Type 5 or other suitable well known flux being disposed adjacent the joint. The assembled parts are heated in an atmosphere of cracked ammonia at 1750° F until the brazing alloy melts and flows between the joint and the assembly, then heated for an additional time to effect sintering of the pressed compact. Upon cooling, a strong joint is obtained. The advantage of this alloy is that substantially little infiltration occurs into the powder metallurgy part.

EXAMPLE 3

A small alundum plate (sintered $Al_2O_3$) is placed on a substrate of 1040 steel with a strip of the brazing alloy interposed between the parts, the composition of the strip comprising 60% Cu, 20% Mn and 20% Zn. A fluoride flux of the AWS Type 3 (note page 687 of said ASM Handbook) comprising fluorides, fluoroborates, boric acid and borates is similarly placed at the joint and the assembly is then heated in an atmosphere of cracked ammonia to a temperature of about 1700° F until the brazing alloy melts and spreads out through the joint. A satisfactory joint between the metal and non-metal substrates is obtained.

EXAMPLE 4

A plate of ductile cast iron is superposed on a plate of 1040 steel. A strip of the brazing alloy (45% Cu, 20% Mn, 29% Zn and 6% Ni) is interposed between the plates with a suitable flux located adjacent the joint. The assembly is passed through a brazing furnace as in Example 1 controlled at 1650° F, the atmosphere comprising the same endo gas. A good joint is obtained, the metallographic structure of the ductile iron being substantially unaffected. Another suitable braze alloy is one containing 15% Mn, 20% Zn and 65% Cu.

As stated hereinabove, one of the advantages of the brazing alloy is that it provides a melting point of below about 1750° F (955° C), for example, a melting point falling within the temperature range of about 1500° F to 1700° F.

Depending upon the materials being brazed, the brazing temperature may range anywhere from over 1550° F to about 1800° F, e.g. 1600° F to 1800° F, preferably 1600° F to 1700° F. The preferred temperature range is particularly applicable to the brazing of ductile iron parts, either to themselves, or to other ferrous metal parts or non-metallic parts.

As illustrative of other embodiments of the invention, the following additional examples are given.

EXAMPLE 5

A batch of titanium diboride ($TiB_2$) powder is hot pressed in the known manner in a mold to form a sintered part thereof of about 90% density of true density. The part is superposed onto a ferrous metal part of 1040 steel with a strip of the brazing alloy (55% Cu, 15% Mn, 23% Zn and 7% Ni) interposed therebetween. The assembled parts with a known fluoride flux are passed through a brazing furnace maintained under non-oxidizing conditions at a temperature of 1700° F, the time at temperature being about 10 minutes. A strong joint is obtained.

EXAMPLE 6

A batch of molybdenum disilicide powder ($MoSi_2$) is hot pressed in the known manner to produce a sintered part having a density between 88% and 92% of true density. The part is superposed onto a ferrous metal as in Example 5 with a strip of brazing alloy (60% Cu, 18% Mn, 15% Zn and 7% Ni) interposed between the assembled parts. The assembled parts with a suitable known flux are passed through a brazing furnace as in Example 5 maintained at a temperature of about 1650° F, the time at temperature being about 6 minutes to provide a strong joint on cooling.

Another suitable alloy is one containing 25% Mn, 30% Zn and 45% Cu.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A brazed joint comprised of assembled parts with a fused brazing alloy interposed therebetween, at least one part being a ferrous metal, said fused brazing alloy making up the joint consisting essentially by weight of about 15% to 30% manganese, about 15% to 30% zinc, 0 to about 10% nickel and the balance essentially copper ranging from about 45% to 65% and having a melting point ranging from about 1500° F to 1700° F.

2. A brazed joint comprised of assembled parts with a fused brazing alloy interposed therebetween, at least one part being a ferrous metal, said fused brazing alloy making up the joint consisting essentially by weight of about 15% to 30% manganese, about 15% to 30% zinc, about 0.5% to 10% nickel and the balance essentially copper ranging from about 45% to 65% and having a melting point ranging from about 1500° F to 1700° F.

3. A brazed joint comprising a ferrous metal part jointed to a part selected from the group consisting of a ferrous metal, a sintered refractory metal oxide ceramic, and borides, silicides and carbides of Zr, Ti, W, Mo and Cr, the braze alloy making up the joint consisting essentially by weight of about 15% to 30% manganese, about 15% to 30% zinc, 0 to about 10% nickel and the balance essentially copper ranging from about 45% to 65% and having a melting point ranging from about 1500° F to 1700° F.

4. The brazed joint of claim 3, wherein the nickel ranges from about 1% to 8%.

5. The brazed joint of claim 3, wherein the braze making up the joint comprises approximately the following: 23% manganese, 22% zinc, 5% nickel and 50% copper.

6. A brazed joint comprising a sintered ferrous powder metallurgy part joined to a cast iron part, the braze alloy making up the joint consisting essentially by weight of about 15% to 30% manganese, about 15% to 30% zinc, 0 to 10% nickel and the balance essentially copper ranging from about 45% to 65% and having a melting point ranging from about 1500° F to 1700° F.

7. The brazed joint of claim 6, wherein the nickel ranges from about 1% to 8%.

8. The brazed joint of claim 6, wherein the braze making up the joint comprises approximately the following: 24.5% manganese, 24.5% zinc, 1% nickel and 50% copper.

9. The brazed joint of claim 6, wherein the cast iron part in the joint is ductile cast iron.

10. A brazed joint comprising a first cast iron part joined to a second cast iron part, the braze alloy making up the joint consisting essentially by weight about 15% to 30% manganese, about 10% to 30% zinc, 0 to 10% nickel and the balance essentially copper ranging from about 45% to 65% and having a melting point ranging from about 1500° F to 1700° F.

11. The brazed joint of claim 10, wherein the nickel ranges from about 1% to 8%.

12. The brazed joint of claim 10, wherein the braze making up the joint comprises approximately the following: 24.5% manganese, 24.5% zinc, 1% nickel and 50% copper.

13. The brazed joint of claim 10, wherein at least the first cast iron part is ductile cast iron.

14. The brazed joint of claim 13, wherein both the first and second cast iron parts in the joint are made of ductile cast iron.

* * * * *

UNITED STATES PATENT OFFICE
CERTIFICATE OF CORRECTION

Patent No. 4,003,715      Dated January 18, 1977

Inventor(s) Paul J. Cascone

It is certified that error appears in the above-identified patent and that said Letters Patent are hereby corrected as shown below:

On the cover sheet, in item [73] "Nynashamn, Sweden" should read -- New York, N. Y. --.

Signed and Sealed this

Seventh Day of June 1977

[SEAL]

Attest:

RUTH C. MASON
Attesting Officer

C. MARSHALL DANN
Commissioner of Patents and Trademarks